June 11, 1935.   A. T. JESTER   2,004,759
RINGING REPEATER
Filed July 12, 1934
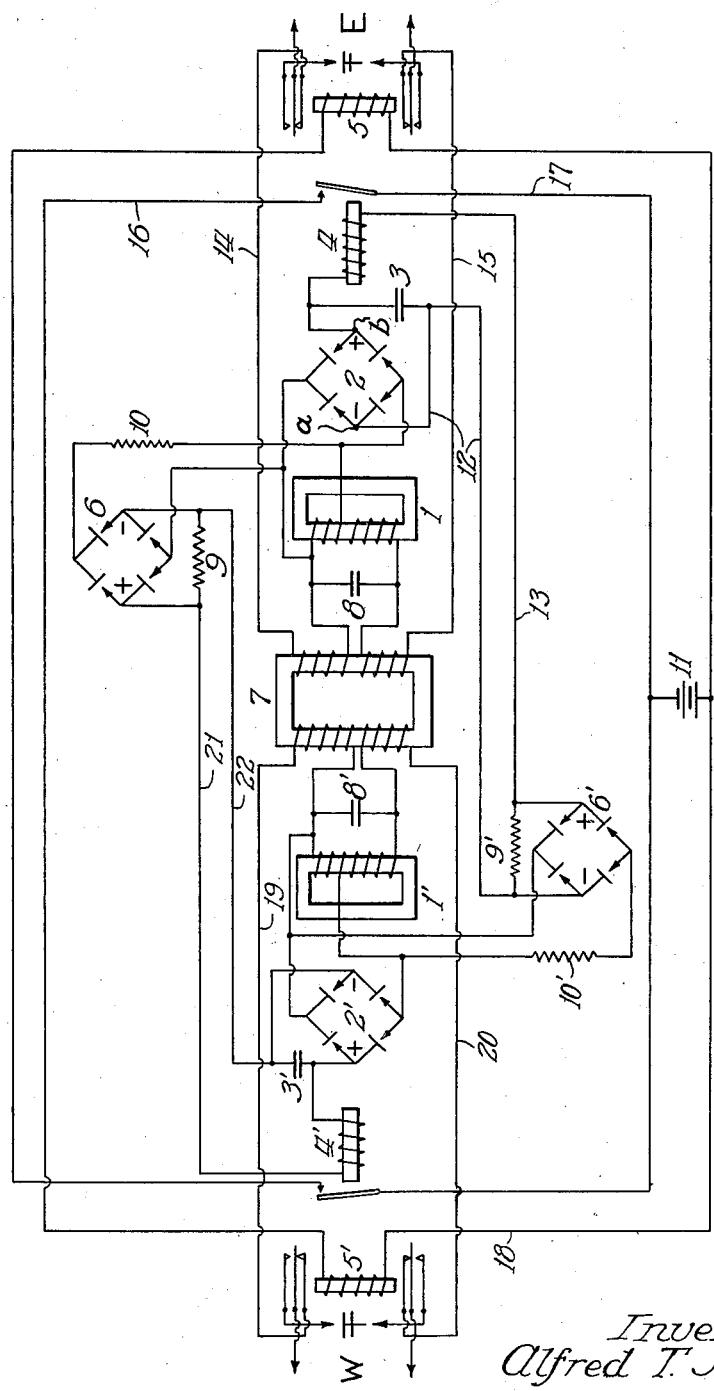
Inventor
Alfred T. Jester
By Jabel Carlson & Wells Attys Patented June 11, 1935

2,004,759

UNITED STATES PATENT OFFICE 2,004,759

RINGING REPEATER

Alfred T. Jester, Houston, Tex.

Application July 12, 1934, Serial No. 734,821

4 Claims. (Cl. 179—84)

My invention relates to ringing repeater circuits for telephone systems and has for its object the provision of certain novel improvements in the circuit whereby the ringing current can be utilized to connect up relays for closing the local circuit from either direction.

I will describe the preferred form of my invention by reference to the accompanying drawing wherein the circuit is shown diagrammatically.

Referring now in detail to the drawing, I show at E the incoming lines from one direction and at W the incoming lines from the other direction. The system embodies a plurality of rectifier type signal relays including the transformers 1 and 1', the bridge type rectifiers 2 and 2', condensers 3 and 3', and relays 4 and 4'. The operation of these relay systems is substantially the same as that disclosed in my application Serial No. 734,820, for Rectifier type signal relay.

The relay devices operate substantially as follows: The incoming telephone ringing current passes through the primary winding of the transformer 1. This induces current in the secondary winding of the transformer which in turn is rectified in the rectifier 2 to deliver a pulsating current to the terminals a and b, the terminal b being connected directly to one end of the relay 4, while the terminal a is connected by means of the conductors 12 and 13 through the resistance 9' to the other end of the relay 4. The condenser 3 connected across the terminals of the rectifier serves the double purpose of acting as a filter and also increasing the current flow through the winding of relay 4.

I will now describe more fully the operation of the repeater circuit which includes the two relay operating systems hereinbefore described. With the ringing current, which may be the usual nineteen cycle ringing current, entering from line E, the path taken will be through the contacts of relay 5 over lines 14 and 15 to the split winding of repeating coil 7, winding of autotransformer 1, thus supplying current to rectifier 2 and winding of relay 4. This causes the local contact of relay 4 to close which connects lines 16 and 17 thus supplying current from battery 11 to relay 5' over lines 17 and 16, and returning over line 18 to battery 11. Energizing of relay 5' closes its contacts causing nineteen cycle current to pass over the line W and at the same time the operation of this relay disconnects repeating coil 7 from line W by opening conductors 19 and 20.

Now when ringing from line E through the winding of repeating coil 7, unless some provision was made to avoid it, the relay 4' would close as well as relay 4 because of the energization of winding 1'.

In order to prevent relay 4' from closing when ringing from line E, an additional rectifier 6 of the same bridge type is connected between the transformer 1 and the rectifier 2. The resistance unit 10 in series with the rectifier 6 and resistance 9 shunted across the output of the rectifier 6 sufficiently control the output of the rectifier 6 to set up across the lines 21 and 22 a current opposing the output current from the rectifier 2'. It will be noted that the positive terminal of rectifier 6 is connected to one end of relay 4' while the positive terminal of rectifier 2' is connected to the other end of relay 4'. Therefore, when ringing from the line E, the effect is to close relay 4 thus closing relay 5', but the opposing current from rectifier 6 will cause relay 4' to remain open.

Assuming that the ringing is taking place from line W, the same results will be produced except that in this case rectifier 6' is in parallel with rectifier 2', and resistances 10' and 9' correspond to resistances 10 and 9 of rectifier 6. Rectifier 6' sets up the necessary opposing current to prevent rectifier 2 from operating its relay 4. Condensers 8 and 8' provide a low resistance path for voice currents when talking is done through the circuit from line E to W or the reverse.

From the above description, it is believed that the operation of this device will be clear to those skilled in this art and that the advantages of the invention will be readily apparent. While I have disclosed one specific form of the invention, it is obvious that various changes may be made without departing from the spirit and scope of the invention as set forth in the claims wherein it is intended to claim all novelty in the application as broadly as possible in view of the prior art.

Having thus described my invention, what I claim as new and desire to secure by Letters Patent is:

1. A ringing repeater circuit for telephone lines comprising a repeating coil interconnecting two transmission lines, means to supply ringing alternating current to either side of said coil, a relay for each line controlling the connection of said coil to the transmission lines, a local source of current for said relays, and means actuated by the alternating current supplied to one side of said repeating coil to connect said local source of current to the relay controlling connection of the other side of said coil to its transmission line, said means comprising direct current relays controlling completion of the local circuit through said relays, and rectifiers receiving current from said repeating coil and supplying current to said last named relays.

2. A ringing repeater circuit for telephone lines comprising a repeating coil interconnecting two transmission lines, means to supply ringing alternating current to either side of said coil, a relay for each line controlling the connection of said coil to the transmission lines, a local source of current for said relays, and means actuated by the alternating current supplied to one side of said repeating coil to connect said local source of current to the relay controlling connection of the other side of said coil to its transmission line, said means including direct current relays controlling completion of the local circuit through said first named relays and means to rectify the alternating current and apply it to said relays.

3. A ringing repeater circuit for telephone lines comprising a repeating coil interconnecting two transmission lines, means to supply ringing alternating current to either side of said coil, a relay for each line controlling the connection of said coil to the transmission lines, a local source of current for said relays, and means actuated by the alternating current supplied to one side of said repeating coil to connect said local source of current to the relay controlling connection of the other side of said coil to its transmission line, said means comprising a pair of relays controlling completion of said local circuit through the first named relays, a pair of rectifiers, one on each side of the repeater coil and having their input circuits connected thereto to be energized by application of alternating current to said repeating coil, the output sides of said rectifiers being connected across the respective coils of said pair of relays, and means to prevent actuation of the relay on the output side of the repeating coil.

4. A ringing repeater circuit for telephone lines comprising a repeating coil interconnecting two transmission lines, means to supply ringing alternating current to either side of said coil, a relay for each line controlling the connection of said coil to the transmission lines, a local source of current for said relays, and means actuated by the alternating current supplied to one side of said repeating coil to connect said local source of current to the relay controlling connection of the other side of said coil to its transmission line, said means comprising a pair of relays controlling completion of said local circuit through the first named relays, a pair of rectifiers, one on each side of the repeater coil and having their input circuits connected thereto to be energized by application of alternating current to said repeating coil, the output sides of said rectifiers being connected across the respective coils of said pair of relays, and means to prevent actuation of the relay on the output side of the repeating coil, said means comprising a rectifier feed from the input side of the repeating coil and connected to the relay to oppose the current from the rectifier across the output of the repeating coil.

ALFRED T. JESTER.